United States Patent [19]
Rouleau

[11] Patent Number: 5,684,647
[45] Date of Patent: Nov. 4, 1997

[54] AUTOMATIC MIRROR POSITIONING SYSTEM FOR TRUCK-TRAILERS AND THE LIKE

[75] Inventor: Jean Rouleau, Bon Conseil, Canada

[73] Assignee: Eric Mandeville, Montreal, Canada

[21] Appl. No.: 450,796

[22] Filed: May 25, 1995

[51] Int. Cl.⁶ .................................................... B60R 1/06
[52] U.S. Cl. .......................... 359/843; 359/844; 359/872; 359/877; 307/10.1
[58] Field of Search .................................. 359/843, 844, 359/872, 877; 307/10.1, 132, 154; 310/75 C

[56] References Cited

U.S. PATENT DOCUMENTS

| | | | |
|---|---|---|---|
| 3,208,343 | 9/1965 | Prochnow | 359/843 |
| 3,469,901 | 9/1969 | Cook et al. | 359/843 |
| 3,749,480 | 7/1973 | De Witt et al. | 359/843 |
| 4,609,265 | 9/1986 | McKee et al. | 359/843 |
| 4,820,032 | 4/1989 | Thompson, Jr. | 359/843 |
| 5,056,905 | 10/1991 | Jensen | 359/843 |
| 5,132,851 | 7/1992 | Bomar et al. | 359/843 |
| 5,196,965 | 3/1993 | Lang et al. | 359/841 |
| 5,249,083 | 9/1993 | Doughtie et al. | 359/843 |
| 5,306,953 | 4/1994 | Weiner | 307/10.1 |
| 5,541,778 | 7/1996 | DeFlorio | 359/843 |

FOREIGN PATENT DOCUMENTS

| | | | |
|---|---|---|---|
| 094817 | 11/1983 | European Pat. Off. | 359/843 |
| WO86/05451 | 9/1986 | WIPO | 359/843 |

*Primary Examiner*—Paul M. Dzierzynski
*Assistant Examiner*—John Juba, Jr.
*Attorney, Agent, or Firm*—Swabey Ogilvy Renault

[57] ABSTRACT

An automatic mirror positioning system is intended for tractor-trailer vehicles such as a tractor provided with a semi-trailer. The tractor includes a fifth wheel used to couple the trailer to the tractor. The system includes an angle detection unit to measure a relative angular pivot between the tractor and the trailer, a computer for interpreting data received from the detection unit, and a mirror assembly which includes a rotatable mirror which is operated by the signals received from the computer, whereby the system modifies the positions of the exterior rearview mirrors of the tractor in view of the relative position of the tractor and the trailer in order that the driver can view the sides and the rear corners of the trailer for any angle defined between the tractor and the trailer. The detection unit which is installed adjacent the fifth wheel includes a pair of spring-biased vertical discs which contact the underside of the trailer so as to rotate whenever there is a relative angular pivot between the tractor and the trailer. As these discs are mounted on the shaft of a step motor, any rotation of the discs will cause the step motor to rotate and to transmit direction and displacement impulses to the computer which after processing the data on the basis of other known parameters will cause the step motor of each mirror assembly to rotate in an established direction and for a calculated angle the respective mirror thereof.

16 Claims, 4 Drawing Sheets

FIG_4

AUTOMATIC MIRROR POSITIONING SYSTEM FOR TRUCK-TRAILERS AND THE LIKE

BACKGROUND OF THE INVENTION

1. Field of the Invention

The present invention relates to truck-trailers, that is tandems each made up of a tractor-truck and a trailer unit hitched thereto such as semi-trailer and, more particularly, to a mirror positioning system which automatically adjusts the position of the exterior mirrors of the tractor-truck so that a driver thereof can view therewith the rear end of the trailer unit for any angle defined between the tractor-truck and the trailer unit.

2. Description of the Prior Art

Truck-trailer units typically consist of a motorized truck tractor and a trailer unit, e.g. semi-trailer, pivotally hitched thereto so as to allow the tractor to pivot in a horizontal plane with respect to the trailer unit when the truck-trailer assembly negotiates a turn. The front truck tractor is conventionally provided with a pair of rectangular exterior side mirrors which are typically vertically elongated and which each can be selectively pivoted about a vertical axis so that the driver can adjust their position so as to appropriately view the road on each side of the truck-trailer unit and at least the rear ends of the sides of the trailer. When the truck-trailer unit is turned, an obtuse angle becomes defined between the front tractor and the rear trailer instead of the 180° angle which is normally defined therebetween when the truck-trailer is ridden in a substantially straight line. Such an angular configuration defined between the tractor and the trailer results in that the driver does not view the same portions of the trailer unit with the exterior mirrors. For example, in a right-hand turn, the right sides of the tractor and the trailer unit form an angle smaller than 180° and the driver will thus see less of the road and more of the right side of the trailer unit with the right exterior mirror, whereas the left exterior mirror will only allow the driver to see the road without being able to view any portion of the trailer unit. Symmetrical problems occur when the truck-trailer is turned left.

Accordingly, various systems have been proposed to allow the driver to view the sides of the trailer for all angles thereof with respect to the tractor and this is achieved, for example, by automatically modifying the position of the exterior mirrors depending on the relative position of the tractor and the trailer unit.

For instance, U.S. Pat. No. 3,208,343 issued on Sep. 28, 1965 to Prochnow discloses, in a tractor-trailer arrangement, an optical reflecting system which includes a pair of mirrors mounted on the front end of the trailer and arranged so that light is reflected from one mirror to the other, the mirrors being displaceable from a retracted inoperable position to an extended operable position in response to a relative angular movement between the tractor and the trailer thereby allowing the driver to view the trailer's sides by looking through the tractor's rear window towards the pair of mirrors mounted on the trailer. This system requires the modification of all trailers and the installation is substantially complex and thus costly.

U.S. Pat. No. 3,469,901 issued on Sep. 30, 1969 to Cook et al. discloses a mirror adjusting device wherein an electrical system automatically adjusts the rearview mirrors of a tractor-trailer vehicle in response to a rotary movement of the tractor's fifth wheel with respect to the trailer's kingpin plate which occurs when the vehicle is being turned with a locking device being provided for holding the mirrors in a predetermined position when the vehicle is driven in a straight line. This system requires that every trailer be modified, at least at the level of its kingpin plate, and furthermore the system is substantially difficult to adapt to every vehicle and its mechanisms are substantially complex.

U.S. Pat. No. 3,749,480 issued on Jul. 31, 1973 to De Witt et al. discloses a rearview mirror rotation system compensating for the relative movement of a tractor-trailer combination having a mechanical sensing device adjacent the fifth wheel. The relative mechanical rotation is converted to an analog electrical signal for rotating the appropriate rearview mirror so that the driver can maintain a line of vision to the rear wheels of the trailer. A control box is positioned adjacent the fifth wheel for sensing relative rotation between the tractor and the trailer. A flexible elastic member extends from the control box to an attachment point on the trailer, along the center line of the fifth wheel kingpin, and perpendicular to the axis of the two vehicles. The control box comprises a vertically extending sealed shaft which is freely rotatable therein with an aligning tube which encloses the elastic member extending outwardly of the sealed shaft. Upon rotation of the tractor relative to the trailer, the elastic as it is free to expand maintains a straight line of connection between the sealed shaft of the control box and the attachment point on the side of the trailer. This results in that the elastic strap causes relative rotation of the aligning tube with respect to the box which results in the rotation of the sealed shaft. This rotation is representative of the relative pivot between the tractor and the trailer and the readings are converted into electric signals which eventually cause pivots of the mirrors until they are adjusted to positions appropriate for the relative position between the tractor and the trailer. This system requires that the tractor be connected to the trailer as the elastic member must extend from the control box on the tractor's fifth wheel to attachment point on the trailer, and this is relatively cumbersome when a new trailer must be hitched to the tractor.

U.S. Pat. No. 4,609,265 issued on Sep. 2, 1986 to McKee et al. discloses a rearview mirror actuating control for tractor-trailers wherein a motor is controlled by switches which selectively actuate the motor in response to the angular displacement of a trailer with respect to the tractor. The switches are actuated in response to movement of the trailer and responsively close a circuit connecting a power source to the motor. The switches disconnect the power source after a predetermined rotation of the motor in order to avoid excess energy use by contacting lobes of a rotating cam at predetermined positions of the cam. The cam may be concentrically secured to the rotor shaft or connected to the shaft by a lever mechanism in order to form a crank which translates the rotor movement to linear displacement on a mirror positioning member. This system appears to be very difficult to program and of insufficient solidity. In addition, the system comprises components which must be installed on the trailer.

U.S. Pat. No. 5,056,905 issued on Oct. 15, 1991 to Jensen discloses a control system for adjustment of a tractor-trailer's rearview mirror wherein there is a transmitter-receiver connected to a drive unit to rotate the mirror along a predetermined angle dependent of the relative position between the tractor and the trailer. The control system is adapted so that the horizontal angular position of the mirror is changed by means of a drive unit in response to changes in the mutual angular position between the tractor and the trailer detected by airborne signals from a transmitter/receiver device. The transmitter is positioned at the rear end of the trailer and the receiver is connected to the drive unit of the mirror through a switch. This is adapted to cause the drive unit to rotate the mirror for a predetermined angle upon receiving the signal. The field of view is turned to a position such that the driver can still see most of the area along and at the rear of the vehicle. The transmitter mounted at the rear of the trailer is subject to damage, or can even fall or be stolen. Parts of the control system, including the transmitters, the wiring and power supplies, are required to be provided on each trailer. There is also a possibility that the signals will be interfered with, such as if more than one tractor-trailer equipped with this control system is present in a same area like in a parking or in loading/unloading bays.

U.S. Pat. No. 5,132,851 issued on Jul. 21, 1992 to Bomar et al. discloses a side mirror rotating apparatus for tractor-trailer vehicles which has a control unit and a transducer coupled to the tractor to determine its angle relative to the trailer using reflected signals so as to accordingly adjust the mirror drive unit. There is at least one transducer coupled to the tractor for transducing signals from the control unit to a signal directed toward the trailer and reflected back to the at least one transducer. The transducers are used to determine an angle between the tractor and the trailer, and a microchip then generates an electric signal which is dependent on the angle between the tractor and the trailer. A transmitter transmits the electric signal, using radio waves, to a receiver unit located near the side view mirror. The receiver unit includes a receiving antenna for receiving the signal transmitted from the transmitter. A drive unit is electrically coupled to the receiver unit for rotating and adjusting the angle of the side view mirror in accordance with the electric signal. This system appears to be relatively adaptable to all tractor-trailer vehicles although again interference with other systems can cause inaccurate readings and therefore improper positionings of the mirror. Its installation also appears to be substantially complex.

U.S. Pat. No. 5,196,965 issued on Mar. 23, 1993 to Lang et al. discloses rearview mirror for motor vehicles having two reflecting plates each adjustable in azimuth and elevation by remote control from switches provided on the dashboard. The mirror in an external housing consists of two plates each movable about orthogonal axes by electric servomotors and heated by electric elements. A lamp may be mounted on top of the housing in conformity with local regulations. The servomotors, heaters and lamp are controlled by a multiplex system with a receiver connected by data bus to an operational unit in the driver's cab. The plates are selected by a rotary switch for pan and tilt movements. This system avoids expensive cable runs and renders retrofitting possible with electrically adjustable external mirrors. An electro-optical system used to appropriately actuate the servomotors which position the mirror comprises a rotary table mounted on the trailer of the tractor-trailer vehicle with the rotary table defining optical angle marks which run past an electro-optical incremental position transducer when the trailer pivots relative to the tractor. The transducer then produces the electric signals which will ultimately cause the servomotors to properly position the mirror in view of the relative position between the tractor and the trailer. However, a rotary table must be installed on each trailer and the overall system is substantially complex.

U.S. Pat. No. 5,306,953 issued on Apr. 26, 1994 to Weiner discloses a rearview mirror positioning and alerting device which detects reflections of ultrasonic beams transmitted from the rear of the tractor to front of the trailer hitched to the tractor. The apparatus for adjusting the position of the external rearview mirror mounted on the tractor has a controllable drive mechanism which is connected to the mirror and which includes an electric motor which rotates the mirror in either direction about its vertical axis. Two ultrasonic transducers mounted on the exterior rear wall of the tractor on opposite sides of the longitudinal centerline project ultrasonic sound beams backwards onto the front wall of the trailer and detect the reflections. A circuit determines the difference in path lengths detected by the transducers and generates control signals to the drive mechanism in accordance with the difference to effect appropriate rotation of the mirror so that the driver can clearly view along side of the trailer when turning.

U.S. Pat. No. 5,249,083 issued on Sep. 28, 1993 to Doughtie et al. discloses automatically controlled rearview mirrors for truck-trailers wherein digital signals are sent to a control panel which operates a stepper motor provided on the mirror thereby turning the mirror in response to the relative angle between the tractor and the trailer. A cable extends between an encoder box located at the rear center of the back of the tractor and the front center of the trailer. The control unit comprises a pivoting device for independently pivoting each mirror in response to predetermined control signals. The encoder box generates and sends the control signals to the pivoting device, the encoder being responsive to a turning angle of the tractor with respect to the trailer wherein as the vehicle is turned the cable is extended in proportion to the turning angle, with the optical encoder generating control signal pulses in response to the length of the extended cable. A switch selectively activates the pivot in response to the direction of the turn whereby the direction of pull of the cable respectively engages the switch in order to pivot one of the two mirrors, the device thus allowing the driver to be able to constantly view the rear of the trailer at all times while making a turn or backing. It appears that this system will be functional in appropriate conditions, although snow, ice and/or dirt might cause inaccurate readings in the system and thus incorrect positioning of the mirror. This system requires that the tractor be connected to the trailer as the cable must extend from the encoder box on the tractor to an attachment device on the trailer.

SUMMARY OF THE INVENTION

It is therefore an aim of the present invention to provide a novel mirror positioning system for use with tractor-trailer vehicles and the like wherein the positions of the tractor's rearview mirrors are adjusted when there is a change in the relative angular position between the tractor and the trailer so that the driver can view substantially at all tithe the sides and the rear of the trailer.

It is also an aim of the present invention to provide a mirror positioning system completely mounted on the tractor, whereby no modifications are required to the trailers.

It is a further aim of the present invention to provide a mirror positioning system which is substantially unaffected by operating conditions, such as snow, ice and dirt and grease build-ups.

It is a still further aim of the present invention to provide a mirror positioning system which also operates the trailer's pop switch when a certain angle is reached between the tractor and the trailer.

It is thus desirable to provide a mirror positioning system which is completely mounted on the tractor, that is without any components on the trailer, and which automatically positions the exterior side rearview mirrors of the tractor in view of the relative angular position of the tractor with respect to the trailer. Also, the system should not be subject of errors resulting from the presence of similar systems on other tractor-trailers or of systems used in different fields but using components of the mirror positioning system, and reference is particularly made to systems based on the use of airborne signals to transmit readings to a data processing unit or the like as, in such systems, signals from outside sources may prevent a proper operation of the mirror positioning system. Furthermore, it is important that the system and, more particularly, the mechanism which initially detects a change in this angular position is not subject to inaccurate readings because of outside elements, such as snow, ice and dirt build-ups. Optical instruments are very sensitive to such occurrences.

Therefore, in accordance with the present invention, there is provided a positioning system for controlling a position of at least one moveable rearview mirror of a vehicle in response to relative positioning of the vehicle with respect to a trailer unit pivotally mounted to the vehicle, comprising a detection device, computer means and mirror actuating means, said detection device being adapted to be mounted to the vehicle and under the trailer unit and comprising at least one rotatable disc means adapted to be in contact with the trailer unit and to rotate upon a pivot of the vehicle relative to the trailer unit, said computer means being adapted to interpret a rotation of said disc means and to cause said mirror actuating means to rotate the mirror such that a driver of the vehicle has through the rearview mirror substantially always a substantially same view of the trailer unit.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Generally, the present invention is intended for tractor-trailer units such as a truck tractor provided with a semi-trailer. The tractor includes a fifth wheel used to couple the trailer to the tractor. When the truck-trailer is turned the trailer pivots in a horizontal plane about the fifth wheel with respect to the tractor. The left and right outside rearview mirrors are normally positioned to allow the driver to view respective sides and rear corners of the trailer. When the tandem is turned the driver can lose from his/her sight the rear corners of the trailer and this is dangerous especially on right-hand turns where the driver cannot see the right rear corner at all as opposed to left-hand turns where the driver can extend his/her head through the driver window to see the left rear corner.

Figure 1:
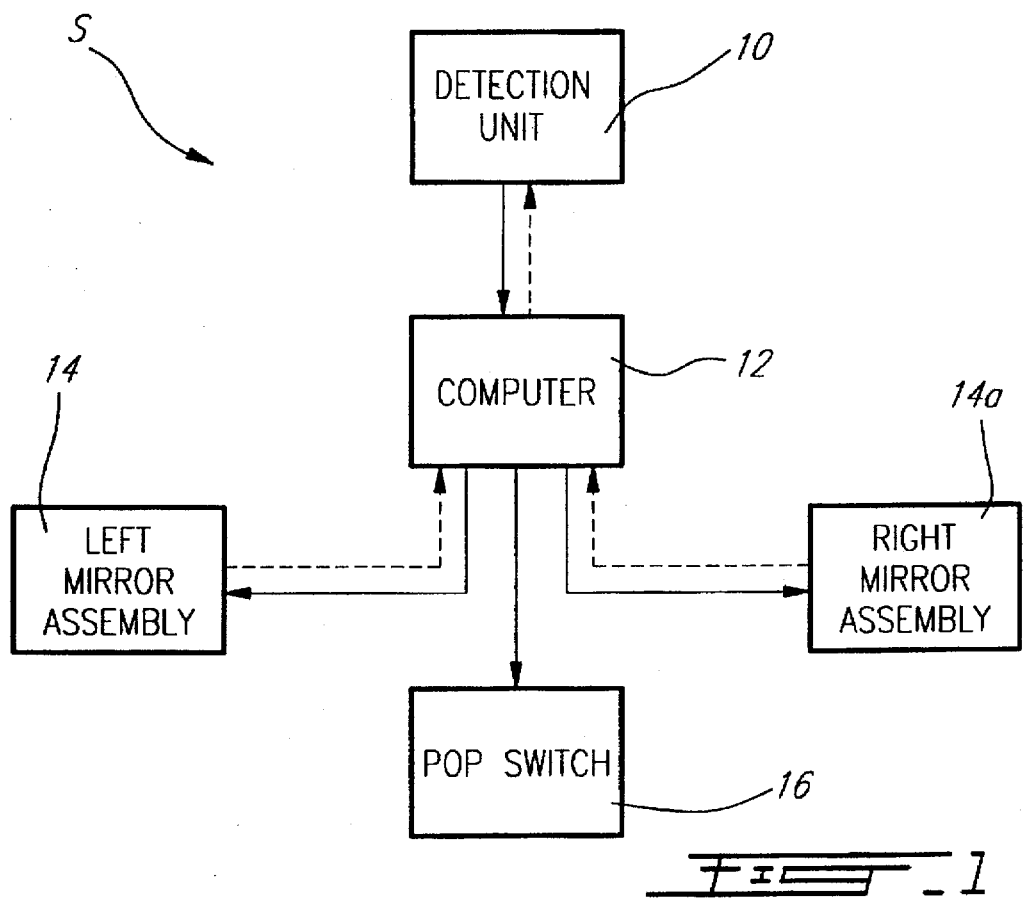
FIG. 1 is a schematic block diagram showing the operation of an automatic mirror positioning system in accordance with the present invention.

FIG. 1 illustrates a block diagram representation of an automatic mirror adjusting system S in accordance with the present invention, wherein the system S is adapted to be installed on a tractor of a tractor-trailer vehicle for measuring the relative angle between the tractor and the trailer attached thereto and for positioning the exterior rearview mirrors of the tractor in view of this relative angle. Therefore, when the angle between the tractor and its trailer is modified during a turn or during straightening of the tractor-trailer vehicle after a turn, the present adjusting system S automatically modifies the respective position of each exterior rearview mirror so that the driver of the tractor can continuously view the sides and the rear corners of the trailer. This is particularly useful when the rig is being backed up at an angle, that is with the tractor not being in a 180° alignment with the trailer.

The adjusting system S comprises basically an angle detection unit 10, a computer 12, and symmetrically disposed and constructed left and right mirror assemblies 14 and 14a, respectively. Furthermore, the system S can also be used to operate a semi-trailer's pop switch 16 which is now operated manually by the driver when it is required to lift the semi-trailer's pop. The pop of a semi-trailer is typically its central axle which must preferably be lifted along with its wheels when the tractor-trailer must undertake a sharp turn with a view of reducing the friction between the semi-trailer and the road surface and thus to facilitate the sharp pivot of the semi-trailer with respect to the truck tractor. The lifting of the semi-trailer's pop is presently done upon a manual command to that effect given by the tractor's driver when a sharp turn is being undertaken. With the present system S, the pop or central axle and the wheels mounted thereto are automatically lifted once a predetermined angle between the tractor and the semi-trailer is reached, with the angle being read by the detection unit 10 and with the computer 12 comparing the data obtained from the detection unit 10 to the aforementioned predetermined angle for selectively causing the pop to be lifted and subsequently lowered respectively once the angle measured by the detection unit 10 exceeds and becomes lower than the predetermined angle.

Figure 2:
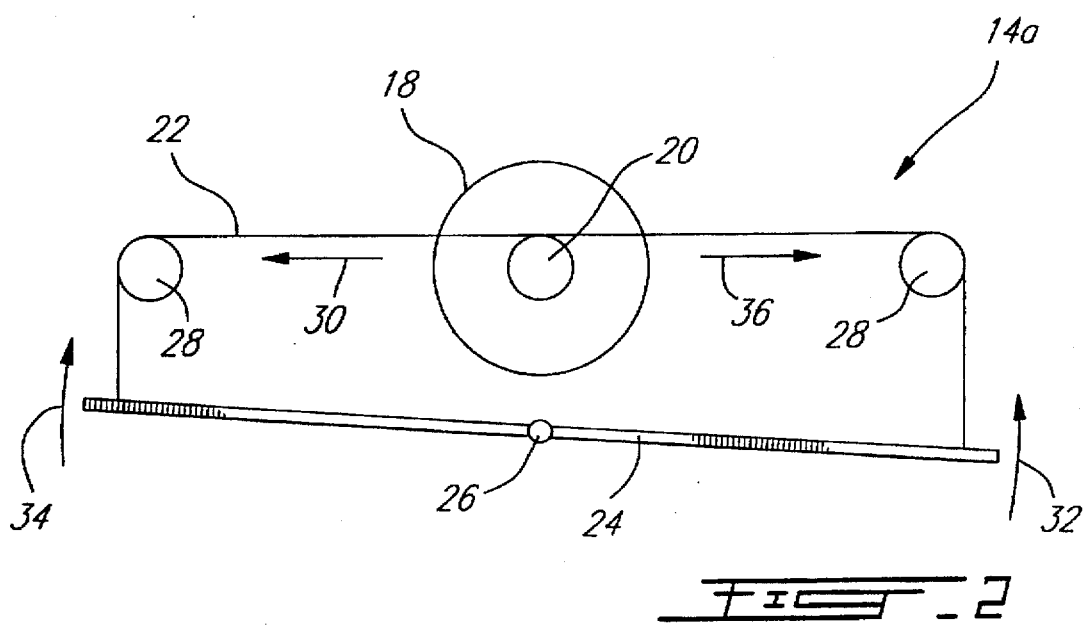
FIG. 2 is a schematic top plan view of a mirror assembly of the mirror positioning system of the present invention.

The computer or controller 12 once it has determined the angle between the tractor and the trailer by way of data obtained from the detection unit 10 (which will be described in details hereinafter) causes, if a predetermined minimum angle change is registered, the position of the rearview mirrors to be modified to ensure that the tractor's driver can continuously view with these mirrors both sides and the rear corners of the trailer. Now referring to FIG. 2, the change in the respective position of the mirrors can be achieved as follows. The right mirror assembly 14a shown in FIG. 2 comprises the following main components, with the left mirror assembly 14 being of similar, albeit generally symmetrical, construction. Hence, the right mirror assembly 14a includes a step motor 18 which is adapted to cause an endless screw 20 to rotate so as to displace a steel cable 22 for appropriately pivoting a mirror 24 about its vertical pivot axis. The cable 22 which engages a pair of pulleys 28 is connected at its ends to vertical sides of the mirror 24 outwardly of the pivot axis thereof with the mirror 24 being pivotally mounted by way of a bushing 26. Therefore, depending on the direction of rotation of the step motor 18, the endless screw 20 and thus the cable 22 will be displaced so as to cause a pivot of the mirror 24 in an appropriate direction and for an appropriate angle. In FIG. 2 which shows the right mirror 24, a right-hand turn of the tractor-trailer vehicle will require an outwards pivot of the mirror 24, without which the driver will only see in the right mirror 24 a portion of the trailer's right side forwardly of the right rear corner thereof. With the present system S, the detection unit 10 will measure the angle change between the tractor and the trailer and the computer 12 will process the readings obtained from the detection unit 10 and will cause the step motor 18 to rotate a sufficient amount for the mirror 24 to pivot until the driver basically can view the right rear corner of the trailer. In the case of the aforementioned right-hand turn, the step motor 18 will operate the endless screw 20 so as to cause the cable 22 to displace along arrow 30 of FIG. 2 and thus the mirror 24 to pivot outwardly along arrow 32. In the case of a left-hand turn, the right mirror 24 must pivot inwardly in order to avoid that the driver only sees the road without being at all able to view the trailer. Therefore, the right mirror 24 will have to pivot along arrow 34 of FIG. 2 thereby requiring that the cable 22 be displaced by the step motor 18 along arrow 36.

Figure 3:
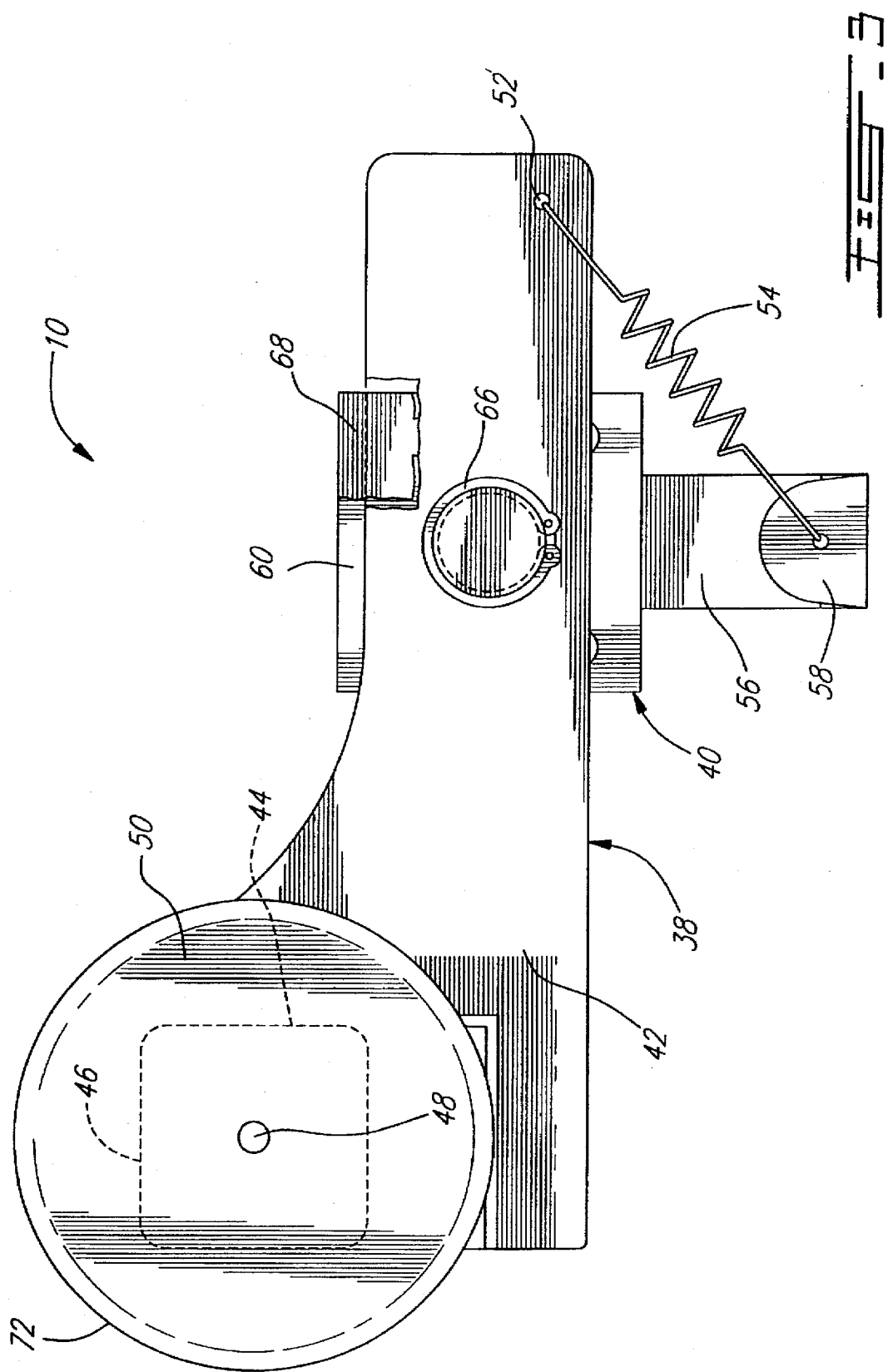
FIG. 3 is a schematic elevational view of an angle detection unit of the mirror positioning system of the present invention.
Figure 4:
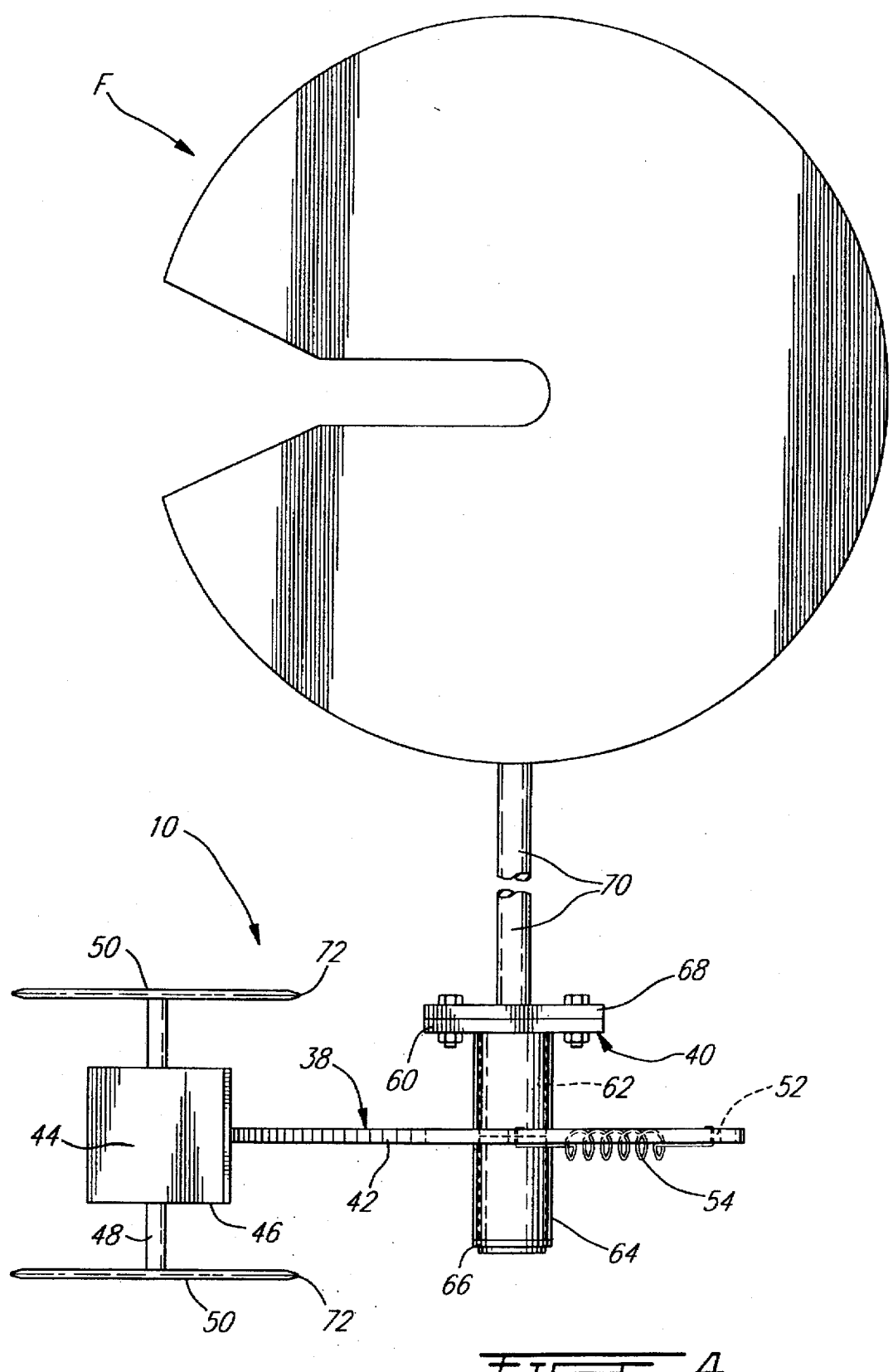
FIG. 4 is a schematic top plan view of the angle detection unit of FIG. 3.
Figure 5:
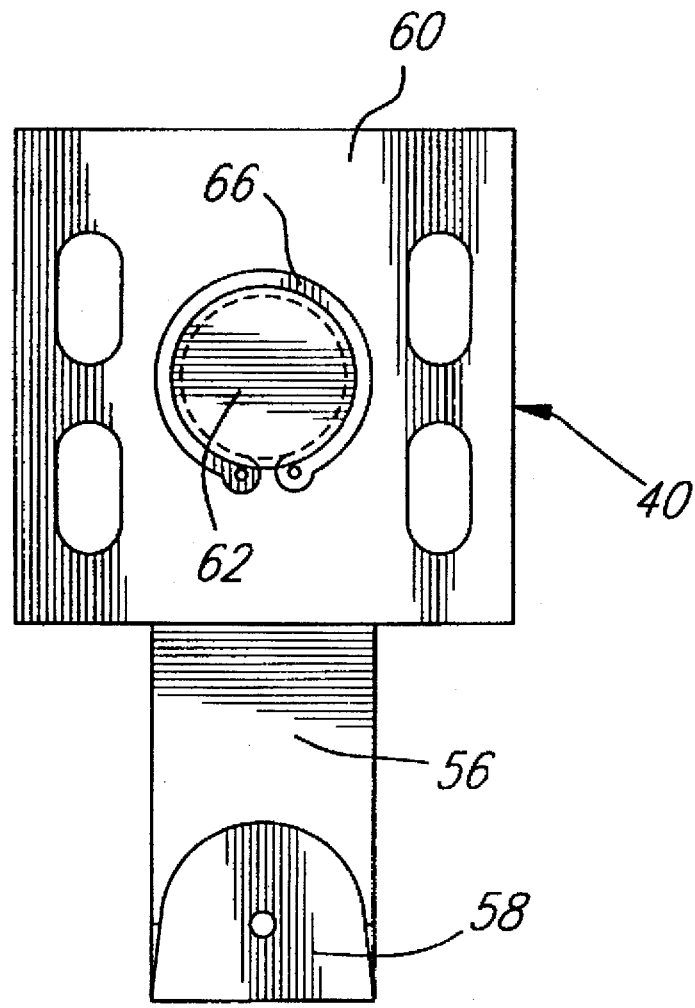
FIG. 5 is a schematic elevational detailed view of a lever support of the angle detection unit.

The angle detection unit 10 which is illustrated in FIGS. 3 to 5 is adapted to be completely mounted on the bed of the tractor adjacent its fifth wheel F. The detection unit 10 comprises a generally horizontally extending elevation lever assembly 38 and a lever support 40. The elevation lever assembly 38 which is pivotally mounted near its center to the lever support 40 in a way which will be described in details hereinafter comprises an elongated lever 42 having at a first end thereof a step motor 44 encased in a housing 46 with a shaft 48 of the step motor 44 extending outwardly of the housing 46 on opposite sides thereof, and also having at its first end a pair of pizza cutter-type vertical discs 50 mounted on the shaft 48 on each side of the housing 46. At a second end of the lever 42, there is defined a hole 52 with a coil tension spring 54 being attached to this second end by the engagement of one of its ends in the hole 52. The other end of the spring 54 is secured to the base of the lever support 40, as described hereinbelow.

The lever support 40 comprises an upstanding post 56 secured at its lower end 58 to the upper surface of the tractor adjacent the fifth wheel F. The aforementioned other end of the spring 54, that is the lower end thereof, is secured to the lower end 58 of the post 56. A vertical square plate 60 is fixedly mounted to the upper end of the post 56 with a large shaft 62 secured to the plate 60 extending horizontally from one side of the plate 60. A horizontal cylinder 64 which extends through the lever 42 and which is fixed thereto has an inside diameter slightly larger than an outside diameter of the shaft 62. To mount the lever assembly 38 to the lever support 40 once the latter has been secured at its lower end 58 to the tractor, the cylinder 64 of the lever assembly 38 is slid over the shaft 62 of the lever support 40 until the square plate 60 substantially abuts the cylinder 64. In this position, the free end of the shaft 62 extends beyond the cylinder 64 and a retaining ring 66 is mounted at this free end of the shaft 62 to prevent it from being withdrawn from the cylinder 64. The shaft 62 is thus journaled in the cylinder 64 but cannot be displaced axially with respect thereto. The cylinder 64 acts as a bushing for the fixed shaft 62. This construction allows for the lever assembly 38 to pivot relative to the lever support 40.

A second plate 68 which is secured by bolts to the plate 60 on a side of the plate 60 opposite its shaft 62 comprises a pivot pin 70 which extends opposite the plate 60 and which engages the fifth wheel F and replaces the conventional horizontal pivot pin thereof, around which the fifth wheel F can pivot. This ensures that the detection unit 10 is positioned at a predetermined distance from the center of the fifth wheel F and thus at a location known by the computer 12.

The two disks 50 are adapted to come in contact with the underside of the trailer once the trailer's king pin has been engaged to the tractor's fifth wheel F. The pulling action of the spring 54 causes a pivot of the lever assembly 38 about the shaft 62 of the lever support 40 thereby urging the discs 50 upwards against the underside of the trailer. The arcuate taper defined in elevation by the upper ends of the discs 50 allows the tractor to be backed up towards the trailer which when it horizontally contacts the discs 50 causes the same to slightly slide downwards thereby providing the necessary clearance for the trailer to ultimately become positioned above the discs 50. As the discs 50 are spring biased towards the underside of the trailer, the contact therebetween will be retained even when the tractor-trailer vehicle encounters vibrations or shocks due to the road surface. The peripheral edge of the discs 50 are substantially sharp to allow the discs 50 to cut through residues or grease and dirt build-ups which can accumulate on the trailer's underside.

As the discs 50 are in contact with the trailer, any angular change between the tractor and the trailer will cause the discs 50 to rotate. A rotation of the discs 50 results in a rotation of the motor shaft 48 and thus of the step motor 44. The rotation of the step motor 44 constitutes a readable measure which is transmitted by way of direction and displacement impulses to the computer 12 which processes the received data on the basis of other parameters (e.g. position of driver's seat, length of trailer, etc.) to determine the required pivots of the mirrors and accordingly transmit direction and displacement impulse signals to the step motors 18 of the mirror assemblies 14,14a so as to adjust their respective positions. Since the two discs 50 are located on a same side of the fifth wheel F, both discs 50 will rotate in a same direction. The direction of rotation of the discs 50 and thus of the shaft 48 and the step motor 44 will allow the computer to determine the direction of turning of the tractor-trailer vehicle. The angular displacement of the discs 50 and thus of the shaft 48 and of the step motor 44 will allow the computer 12 to determine the size of the turn. It is noted that the outside disc of the two discs 50 will have a slightly greater diameter than the inside disc in order that the angular displacement of both discs 50 is identical even though the rotation radius of the outside disc with respect to the center of the fifth wheel F (which is the rotation point of the trailer and tractor) is greater than that of the inside disc. It is noted that a single disc 50 would be sufficient but the lack of equilibrium in the forces acting on the trailer might cause the bushing of the motor shaft 48 to become worn.

When the trailer must be hitched to the tractor, the tractor's driver engage the tractor and the trailer together while in an aligned position, that is with the tractor and the trailer defining an angle of substantially 180°. After the tractor and the trailer have been engaged to one another, the driver manually positions the two outside rearview mirrors to his/her liking for such an aligned position. The computer 12 is then resetted and these basic mirror positions will be then used by the computer 12 to establish new mirror positions for angles between the tractor and the trailer that are different than 180 °.

It is noted that the computer or controller 12 can be programmed to take into consideration other parameters than the zero-setting and the position of the discs 50, such as the position of the driver's seat, the length of the trailer (e.g. 48 feet, 53 feet, or even 20 feet for containers positioned on a flatbed), etc.

The present system S can also be used on farm tractors onto which are hitched various trailer units. Basically, it can be used on any motorized vehicle having another vehicle depending therefrom and pivotally connected thereto.

The present system S is of low cost; it can operate in any conditions; and it is simply installed on the tractor without any modifications to the trailers. The present system S improves greatly the safety and the ease of driving in difficult positions.

I claim:

1. A positioning system for controlling a position of at least one moveable rearview mirror of a vehicle in response to relative positioning of the vehicle with respect to a trailer unit pivotally mounted to the vehicle, comprising detection means for detecting rotation of the trailer unit relative to the vehicle, said detection means being adapted to be mounted to the vehicle so as to be located under the trailer unit when the latter is hitched to the vehicle, said detection means comprising at least one rotatable disc means for contacting the trailer unit without modification of the trailer unit and for rotating upon pivoting of the vehicle relative to the trailer unit;

computer means for measuring a rotation of said disc means; and mirror actuating means, responsive to said computer means, for rotating said mirror such that a driver of the vehicle has substantially always a same view of the trailer unit using the rearview mirror.

2. A positioning system as defined in claim 1, further comprising pop switch actuating means operable by said computer means for operating a pop switch of the trailer unit to cause a pop of the trailer unit to raise upon reaching a predetermined angle between the vehicle and the trailer unit as detected by said detection means.

3. A positioning system as defined in claim 1, wherein said detection means are mounted to a bed of the vehicle adjacent to a fifth wheel thereof, said detection means comprising pivot pin means engaged in the fifth wheel for ensuring a predetermined distance between said disc means and a center of the fifth wheel.

4. A positioning system as defined in claim 1, wherein said disc means are mounted in a vertical orientation to a pivotable lever means, spring means acting on said lever means for upwardly urging said disc means against the trailer.

5. A positioning system as defined in claim 4, wherein said disc means comprise a pair of parallel and spaced apart discs.

6. A positioning system as defined in claim 5, wherein said detection means comprise a shaft with said discs being fixedly mounted thereon such that said shaft rotates with said discs upon said pivoting, and also comprise step motors means rotated by said shaft for sending direction and displacement signals to said computer means.

7. A positioning system as defined in claim 5, wherein said discs are of different diameters to compensate for a difference in relative distances between each of said discs and the fifth wheel.

8. A positioning system as defined in claim 1, wherein said disc means are vertically oriented and define sharp peripheral edges such as to cut through residues present on the trailer.

9. A positioning system for controlling a position of at least one moveable rearview mirror of a vehicle in response to relative positioning of the vehicle with respect to a trailer unit pivotally mounted to the vehicle, comprising detection means for detecting rotation of the trailer unit relative to the vehicle, said detection means being adapted to be mounted to the vehicle so as to be located under the trailer unit when the latter is hitched to the vehicle, said detection means comprising at least one rotatable disc means for contacting the trailer unit and for rotating in a vertical plane upon pivoting of the vehicle relative to the trailer unit;

computer means for measuring a rotation of said disc means; and mirror actuating means, responsive to said computer means, for rotating said mirror such that a driver of the vehicle has substantially always a same view of the trailer unit using the rearview mirror.

10. A positioning system as defined in claim 9, further comprising pop switch actuating means operable by said computer means for operating a pop switch of the trailer unit to cause a pop of the trailer unit to raise upon reaching a predetermined angle between the vehicle and the trailer unit as detected by said detection means.

11. A positioning system as defined in claim 9, wherein said detection means are mounted to a bed of the vehicle adjacent to a fifth wheel thereof, said detection means comprising pivot pin means engaged in the fifth wheel for ensuring a predetermined distance between said disc means and a center of the fifth wheel.

12. A positioning system as defined in claim 9, wherein said disc means are mounted to a pivotable lever means, spring means acting on said lever means for upwardly urging said disc means against the trailer.

13. A positioning system as defined in claim 12, wherein said disc means comprise a pair of parallel and spaced apart discs.

14. A positioning system as defined in claim 13, wherein said detection means comprise a shaft with said discs being fixedly mounted thereon such that said shaft rotates with said discs upon said pivoting, and also comprise step motors means rotated by said shaft for sending direction and displacement signals to said computer means.

15. A positioning system as defined in claim 13, wherein said discs are of different diameters to compensate for a difference in relative distances between each of said discs and the fifth wheel.

16. A positioning system as defined in claim 9, wherein said disc means are vertically oriented and define sharp peripheral edges such as to cut through residues present on the trailer.

* * * * *